W. CALLAWAY.
ROOSTING DEVICE FOR FOWLS.
APPLICATION FILED APR. 15, 1912.
1,109,612.
Patented Sept. 1, 1914.
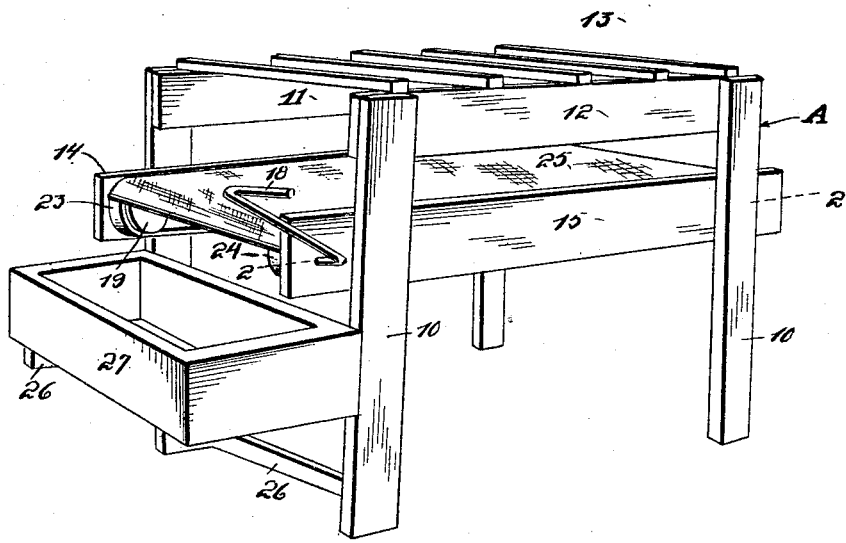
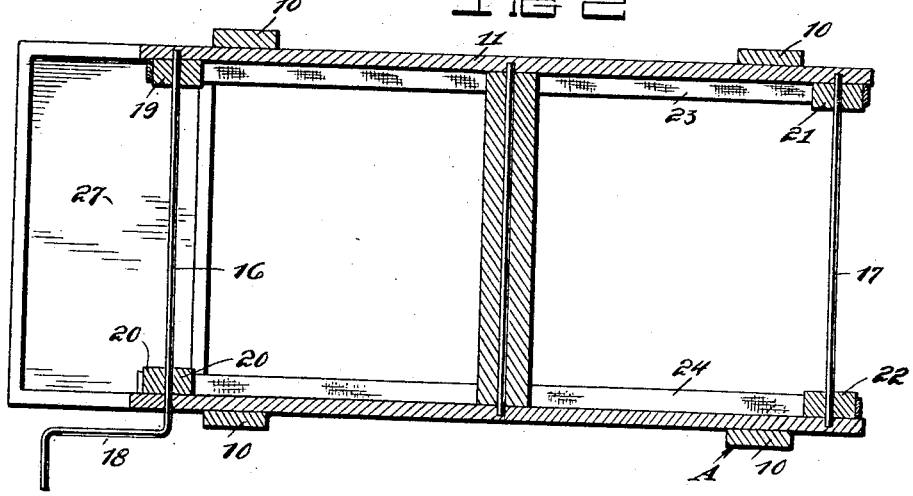
Witnesses
Frank S. Ratcliffe
Henry T. Bright
Inventor
W. Callaway
By Chandler & Chandler
Attorneys

UNITED STATES PATENT OFFICE.

WILLIAM CALLAWAY, OF WICHITA, KANSAS.

ROOSTING DEVICE FOR FOWLS.

1,109,612.

Specification of Letters Patent. Patented Sept. 1, 1914.

Application filed April 15, 1912. Serial No. 690,788.

*To all whom it may concern:*

Be it known that I, WILLIAM CALLAWAY, a citizen of the United States, residing at Wichita, in the county of Sedgwick, State of Kansas, have invented certain new and useful Improvements in Roosting Devices for Fowls; and I do hereby declare the following to be a full, clear, and exact description of the invention, such as will enable others skilled in the art to which it appertains to make and use the same.

This invention relates to roosting devices for fowls.

The object of the invention resides in the provision of a roosting device of the character referred to which may be readily incorporated in a poultry-house and when so incorporated will provide an efficient means for readily cleaning the poultry-house or like inclosure, the device being adapted to catch the droppings that are voided by the fowls while roosting and then operated when desired to effect the deposit of such droppings in a suitable receptacle.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters denote corresponding parts in the several views, and in which—

Figure 1 is a perspective view of a roosting device constructed in accordance with the invention, and Fig. 2, a section on the line 2—2 of Fig. 1.

Referring to the drawing the device is shown as comprising a frame A which includes corner uprights 10 and upper side members 11 and 12 which connect respectively the corner uprights 10 disposed on corresponding sides of the frame. The upper side members 11 and 12 are connected to each other by a plurality of roost bars 13 disposed transversely of the frame and in parallel spaced relation to each other. Connecting the corner uprights 10 on corresponding sides of the frame A are lower side members 14 and 15 respectively. These lower side members 14 and 15 are disposed in the same horizontal plane and have their terminals extended beyond the uprights 10 and beyond the ends of the upper side members 11 and 12 respectively. Journaled in respective ends of the lower side members are shafts 16 and 17 the former of which terminates at one end in a crank 18 by which it may be rotated manually for a purpose that will hereinafter appear. The shaft 16 has fixed thereon adjacent the inner faces of the lower side members 14 and 15 respectively belt wheels 19 and 20, while the shaft 17 has fixed thereon in alinement with the belt wheels 19 and 20 belt wheels 21 and 22 respectively. Traveling on the belt wheels 19 and 21 is an endless belt 23 while a corresponding belt 24 travels on the belt wheels 20 and 22. Connecting the belts 23 and 24 is a flexible web 25 of any suitable material and of a length sufficient to dispose the terminals thereof beyond the terminal roost bars 13 when said web has been moved to a position to catch the droppings voided by fowls disposed upon said roost bars. It will be noted that the diameters of the belt wheels 19, 20, 21 and 22 is such that the peripheries of said wheels are disposed inwardly of the upper and lower edges of the lower side members 14 and 15 so that said side members serve to prevent lateral discharge of the droppings from the web 25.

Supported upon one end of the frame upon brackets 26 is a receptacle 27. This receptacle is disposed directly under the shaft 16 and in position to receive the droppings delivered from the web 25 during the operation of the device. The web 25 is supported centrally by means of a roller 28 journaled between the lower side members 14 and 15 intermediate the shafts 16 and 17.

When the roost is in use by the fowl the web 25 is disposed beneath the roost bars 13 and liberally sprinkled with saw dust or earth to prevent the droppings from sticking thereto.

To clean the device it is only necessary to rotate the shaft 16 by rotating the crank 18 to the left. This will move the web 25 around the wheels 19 and 20 and during this movement of the web the droppings carried thereby will be deposited in the receptacle 27 after which they may be carried out of the poultry-house and discharged where desired.

It will be apparent that by the use of the device the labor incident to keeping the poultry-house clean and sanitary will be greatly lessened while at the same time the removal of the droppings will enhance the value of the fowl.

What is claimed is:

In a device of the kind described, the combination with a series of poultry perches; of a pair of spaced shafts located in a plain lower than said perches, spaced belts carried upon said shafts, and a web attached to said belt and extending substantially half way along said belts.

In testimony whereof, I affix my signature, in presence of two witnesses.

WILLIAM CALLAWAY.

Witnesses:
L. C. DAVIS,
W. T. McGINNESS.

Copies of this patent may be obtained for five cents each, by addressing the "Commissioner of Patents, Washington, D. C."